(12) United States Patent
Kritt et al.

(10) Patent No.: US 9,342,224 B2
(45) Date of Patent: May 17, 2016

(54) SOCIAL NETWORKING WEB SITE PICTURE ALBUM NAVIGATION PATH

(71) Applicant: LENOVO ENTERPRISE SOLUTIONS (SINGAPORE) PTE. LTD., New Tech Park (SG)

(72) Inventors: Barry Alan Kritt, Raleigh, NC (US); Sarbajit Kumar Rakshit, Kolkata (IN); Anthony Cappa Spielberg, Austin, TX (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 179 days.

(21) Appl. No.: 14/159,423

(22) Filed: Jan. 20, 2014

(65) Prior Publication Data

US 2015/0205493 A1    Jul. 23, 2015

(51) Int. Cl.
*G06F 3/00* (2006.01)
*G06F 3/0484* (2013.01)
*H04L 12/18* (2006.01)
*H04L 12/58* (2006.01)

(52) U.S. Cl.
CPC ........ *G06F 3/04842* (2013.01); *H04L 12/1813* (2013.01); *H04L 51/16* (2013.01); *H04L 51/32* (2013.01); *H04L 51/10* (2013.01)

(58) Field of Classification Search
None
See application file for complete search history.

(56) References Cited

U.S. PATENT DOCUMENTS

| 7,656,399 | B2* | 2/2010 | Ono | G06T 11/60 345/204 |
| 2012/0278730 | A1 | 11/2012 | Cannon et al. | |
| 2013/0191754 | A1* | 7/2013 | Rose | H04N 1/00198 715/732 |
| 2014/0096007 | A1* | 4/2014 | Itoh | G06F 17/30056 715/732 |
| 2014/0317511 | A1* | 10/2014 | Bailiang | G06F 3/04842 715/730 |
| 2015/0101026 | A1* | 4/2015 | Kraus | H04L 63/102 726/4 |
| 2015/0106722 | A1* | 4/2015 | Ubillos | G06F 3/0488 715/731 |

* cited by examiner

*Primary Examiner* — Stephen Alvesteffer
(74) *Attorney, Agent, or Firm* — Katherine Brown

(57) ABSTRACT

A creator can specify one or more navigation paths through an album of pictures on a social networking web site. Each navigation path has a name and specifies a sequence in which a number of the pictures are to be viewed by a viewer. The viewer can select by name the desired navigation path through the album. A navigation path through the album can also be determined from content in which the viewer is interested from a profile of the viewer on the social networking web site. A navigation path can be determined from users on the social networking web site that are associated with the viewer on the web site. A navigation path can be determined from analysis of an interaction history of the viewer on the social networking web site, apart from the viewer's profile and the viewer's associated users on the web site.

18 Claims, 4 Drawing Sheets

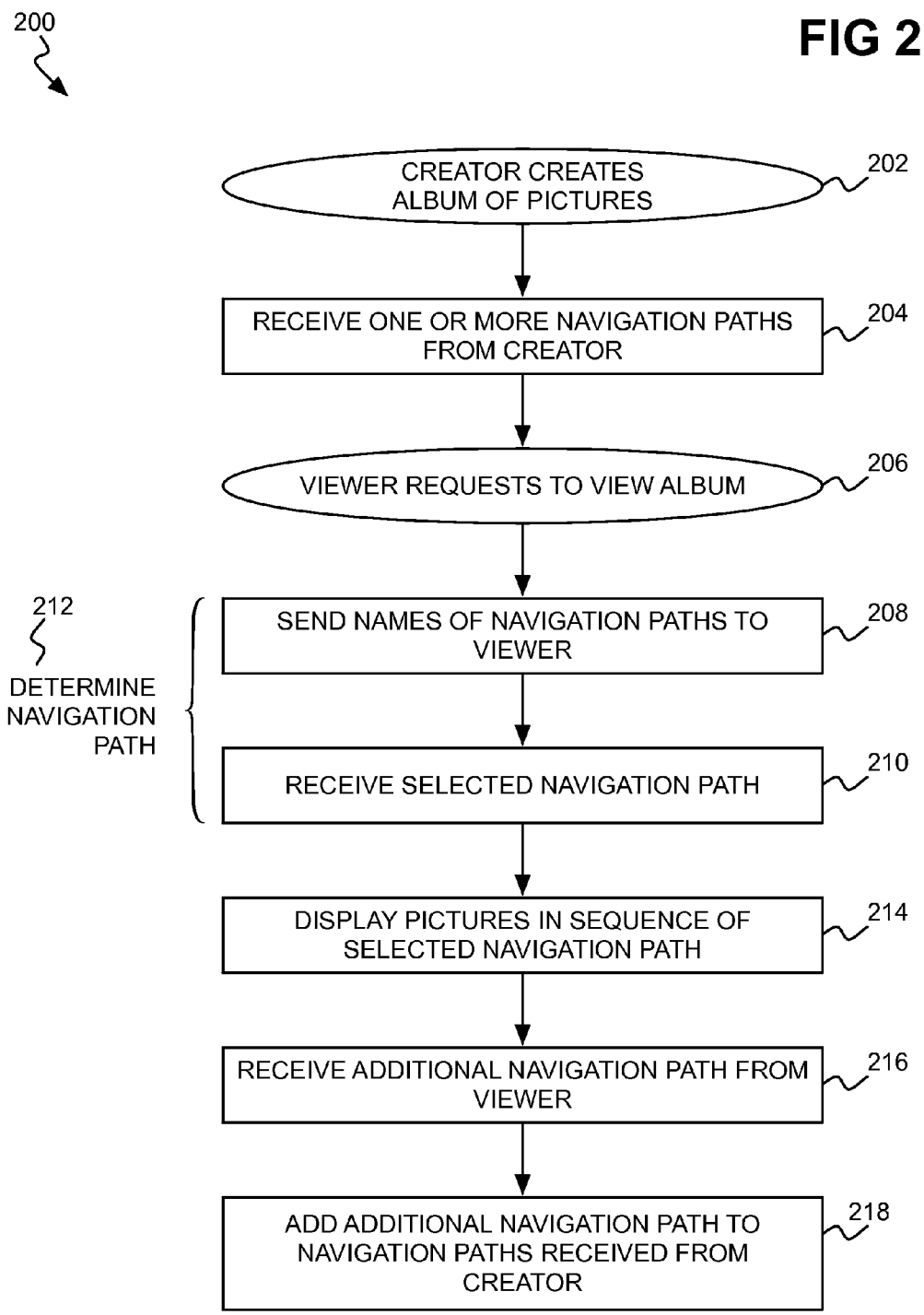

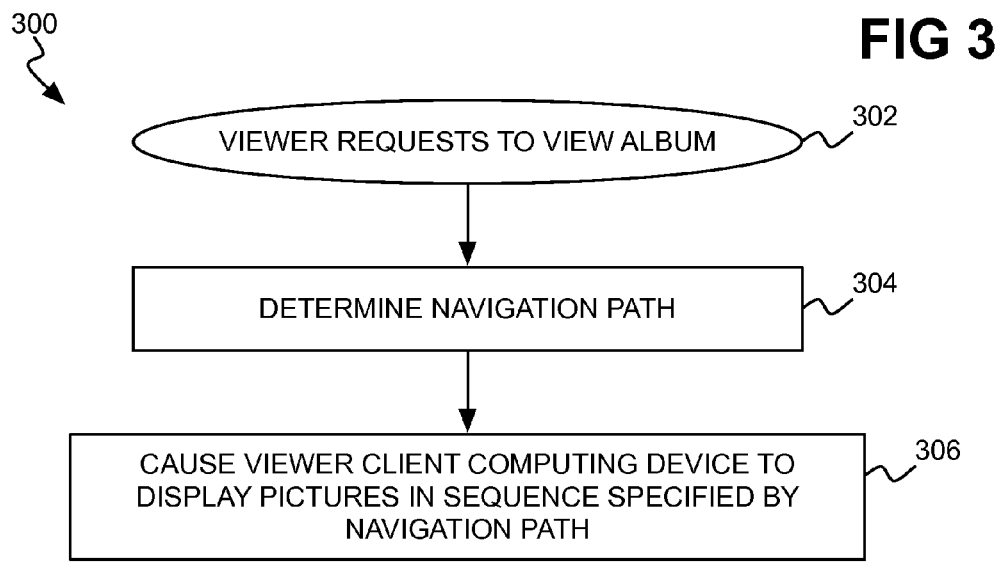
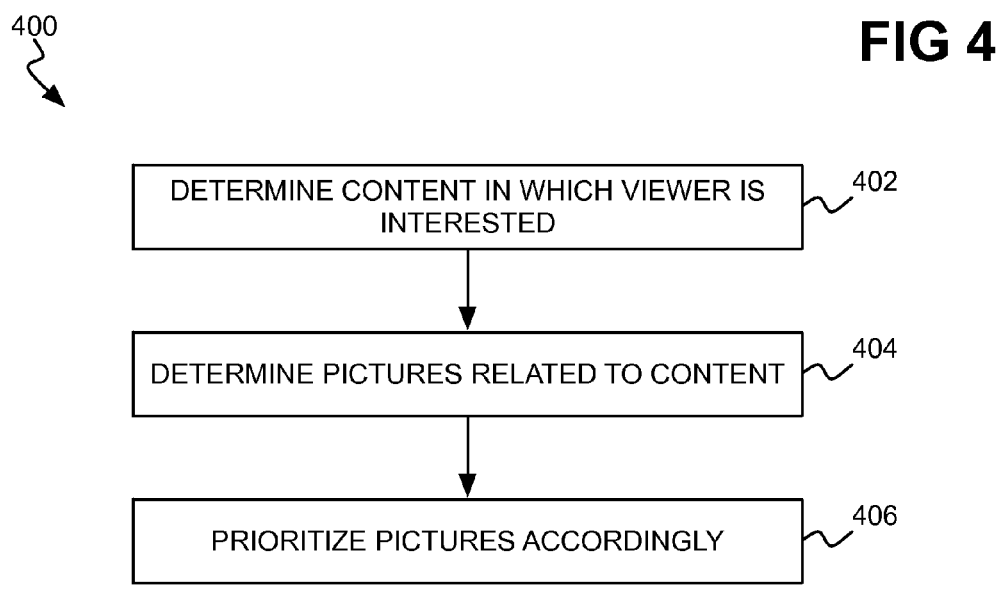

SOCIAL NETWORKING WEB SITE PICTURE ALBUM NAVIGATION PATH

BACKGROUND

Social networking web sites let users interact with other users, who are commonly referred to as friends. One common usage scenario of social networking web sites is to permit a user to share pictures, like digital photographs, with the user's friends. For example, a user may take a vacation, and then share the digital photos taken on the vacation with his or her friends, so that they have an opportunity to see what the user did and saw while on vacation.

SUMMARY

An example method includes, in response to a user operating a user client computing device creating an album of pictures on a social networking web site, receiving, by a server computing device for the social networking web site, from the user one or more navigation paths through the album. Each navigation path has a name and specifies a sequence in which a number of the pictures are to be viewed by a viewer operating a viewer client computing device. The method includes, in response to the viewer requesting to view the album of pictures, sending, by the computing device to the viewer client computing device, the name of each navigation path. The method includes, in response to receiving from the viewer a selected navigation path of the one or more navigation paths, causing, by the computing device, the viewer client computing device to display the number of the pictures in the sequence specified by the selected navigation path.

An example computer program product includes a storage device storing computer-executable code executable by a server computing device for a social networking web site to perform a method. The method includes, in response to a viewer operating a viewer client computing device requesting to view an album of pictures, determining a navigation path specifying a sequence in which a number of the pictures are to be viewed by the viewer. The sequence is different than an order in which a creator of the album uploaded the pictures to the social networking web site when creating the album. The method includes, after determining the navigation path, causing the viewer client computing device to display the number of the pictures in the sequence specified by the navigation path.

An example system for a social networking web site includes communication hardware to communicatively connect with client computing devices of users of the social networking web site, including a viewer and a creator. The system includes a processor and a storage device to store computer-executable code executed by the processor. The system includes an album module implemented by the computer-executable code to permit the creator to upload pictures to the social networking web site and to create an album of the pictures. The system includes a navigation path module implemented by the computer-executable code to determine one or more navigation paths through the album, each navigation path specifying a sequence in which a number of the pictures are to be viewed by the viewer. The system includes a display module implemented by the computer-executable code to display the pictures of the album to the viewer in the sequence specified by one of the navigation paths.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIGS. 2, 3, 4, 5, and 6 are flowcharts of example methods that can be performed in relation to the example computing environment of FIG. 1.

DETAILED DESCRIPTION

Figure 1:
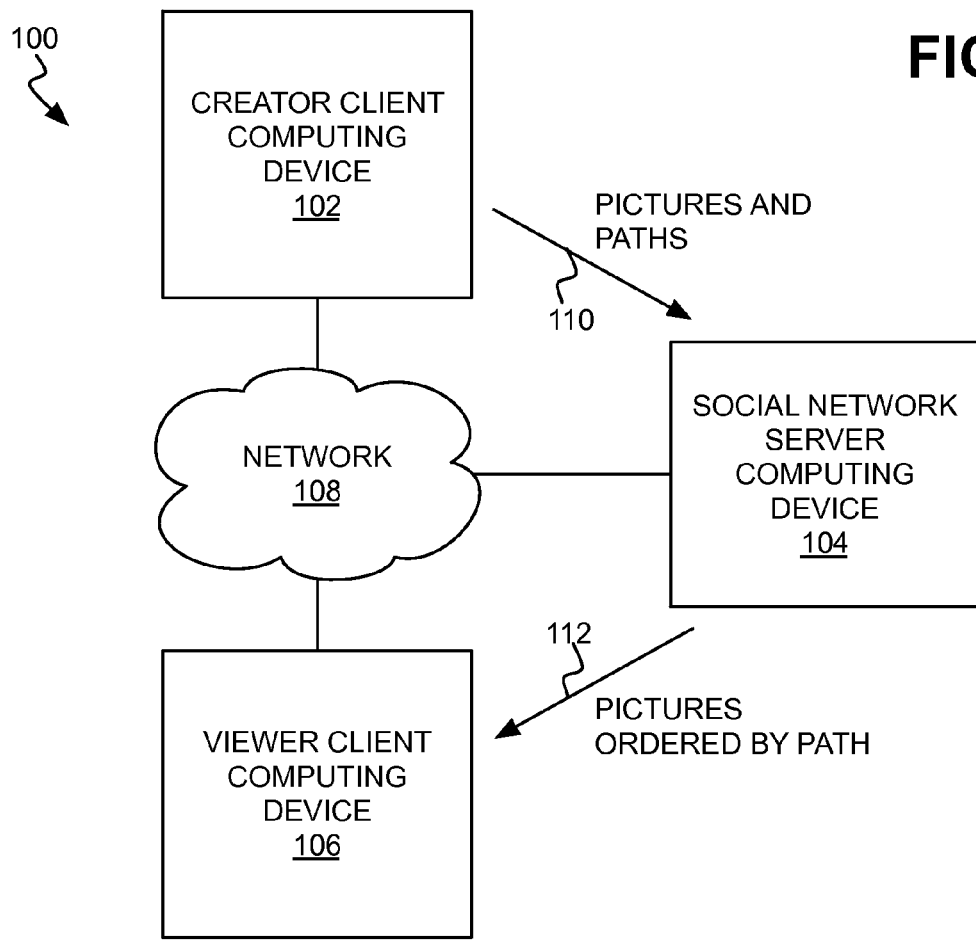
FIG. 1 is a diagram of an example computing environment.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, social networking web sites commonly permit users to upload pictures and create albums thereof for viewing by the users' friends. A user typically uploads a number of pictures and correspondingly creates an album. The user may alternatively select pictures that have already been uploaded to create an album. At a later point in time, the user may also add other pictures to an existing album. An album is thus a collection of pictures that have something in common. For instance, an album may include the photos that a user took while on vacation.

Some albums can have large numbers of pictures. Social networking web sites may permit a user to select which picture is the cover picture for an album. However, the user has no way to specify the order in which his or her friends view the pictures. In general, social networking web sites display the pictures to a user's friends in the order in which the pictures were added to the album, such as the order in which the pictures were uploaded by the user in the case where an album is created for newly uploaded pictures.

Disclosed herein are techniques that alleviate the shortcomings associated with this inability. In one technique, a user can create one or more navigation paths through an album. Each navigation path has a number and specifies a sequence in which the pictures of the album are to be viewed. A given navigation path may not specify a sequence through all the pictures of an album, however, but just some of the pictures. A viewer can then select which navigation path he or she wishes to use to view the album, and may also be permitted the opportunity to him or herself create an additional navigation path through the album for the benefit of others.

For example, a user may have taken a European vacation, in which the user took many pictures of the countryside, the beach, churches, and cities. The user may thus create a countryside navigation path specifying a sequence through just the pictures of the countryside, a cities navigation path specifying a sequence through just the pictures of cities, and so on. Furthermore, the user can order the countryside pictures within the sequence of the countryside navigation path in a particular order, which may or may not be chronological. For any navigation path, the user can thus create a desired sequence through some or all of the pictures of the album.

In another technique, the social networking web site determines a navigation path through an album without direct interaction from the user who had uploaded the pictures or from a viewer who wishes to view the album. The navigation path is created particular to a viewer. For example, content in which the viewer is interested may be determined from the viewer's profile on the social networking web site, and the pictures of the album that are related to this content are prioritized within the sequence of the created navigation path. As a second example, users on the social networking web site that are associated with the viewer—i.e., the viewer's friends on the web site, and possibly the viewer him or herself—are determined, and the pictures of the album that include these users are prioritized within the sequence.

Therefore, different viewers may have different navigation paths through the same album, depending on their profile interests and their friends. A viewer listing soccer on his or her profile as an interest, for instance, may have pictures of soccer games, soccer players, and soccer fields prioritized within the sequence of the created navigation path. Pictures of other sporting events may be prioritized next within the sequence, since soccer is a sport, but not all sports are soccer.

As a third example, an interaction history of the viewer on the social networking web site—apart from the viewer's profile and his or her friends—can be analyzed to determine the viewer's favored items, and pictures that include these favored items are prioritized within the sequence of the created navigation path. For instance, it may be determined that a viewer views a lot of pages on the social networking web site that relate to zoos. As such, pictures taken at zoos may be prioritized within the sequence, and pictures taken of animals commonly found at zoos but where the pictures were taken of the animals in the wild may be prioritized next, and so on.

FIG. 1 shows an example computing environment 100 in which the techniques disclosed herein can be implemented. The computing environment 100 includes a creator client computing device 102, a social network server computing device 104, and a viewer client computing device 106 that are communicatively interconnected over a network 108 like the Internet. The client computing devices 102 and 106 may be smartphones, tablets, as well as more traditional computers like laptop and desktop computers, and so on. The users that operate the client computing devices 102 and 106 may be friends on the social networking web site that the social network server computing device 104 operates. The user of the client computing device 102 is referred to as a creator of a picture album herein, and the user of the client computing device 106 is referred to as a viewer of the picture album herein. A user can be both a creator and a viewer, of the same or different album, at different times.

The creator uses the client computing device 102 to upload pictures to the social network server computing device 104 over the network 108, as indicated by the arrow 110. The creator then creates an album including at least some of these pictures. The creator may specify one or more navigation paths through the album, each of which the creator gives a unique name and a unique sequence through the same or different pictures of the album, which may include some but not all of the album's pictures.

The viewer uses the client computing device 106 to view the pictures of the album. As such, the social network server computing device 104 determines a navigation path through the pictures, which can be one of the navigation paths created by the creator if any were so created and which was selected by the viewer. Alternatively, the navigation path may be a different navigation path through the pictures that the server computing device 104 itself generates. The server computing device 104 displays the pictures of the album to the viewer at the viewer client computing device 106 over the network 108, in the order specified by the sequence of the determined navigation path.

FIG. 2 shows an example method 200 that can be used in conjunction with the computing environment 100. The method 200 is performed by the social network server computing device 104 operating a social networking web site. A creator creates an album of pictures (202), in response to which the server computing device 104 receives one or more navigation paths through the album from the creator (204).

Each navigation path has a name, and specifies a sequence in which a number of the pictures are to be viewed by a viewer. The number of pictures of any navigation path can be less than the total number of pictures within the album. The sequence of any navigation path can be different than the order in which the creator uploaded the pictures to the social networking web site, such as when creating the album. The pictures of the album that the navigation paths provide sequences through may be different from one another. For example, one navigation path may specify a sequence among pictures A, B, C, and D, and another navigation path may specify a sequence through pictures B, C, E, F, and G. As such, the number of pictures that each navigation path specifies a sequence through can be different.

The creator can specify the sequence through the pictures of an album in a number of different ways. The social networking web site may display all the pictures of the album, and the creator permitted to select the pictures in an order corresponding to the sequence of a navigation path being created. The creator may be able to drag and drop the pictures so that they are displayed in an order corresponding to the sequence of a navigation path, and similarly may be able to reorder the sequence if desired, including removing and adding pictures from the navigation path.

In one implementation, the user is permitted to schedule when a given navigation path is available. The schedule may be triggered by an event or by time. As an example of the latter, the navigation path may be unavailable from 5 AM to 10 PM, and otherwise may be available, everyday or on certain days. Events can also trigger the activation or deactivation of a navigation path.

At some point, a viewer requests to view the album of pictures (206). In response, the server computing device 104 sends to the viewer client computing device 106 the names of the navigation paths that have been created for the album (208). The client computing device 106 may display the names of the navigation paths, which are desirably descriptive of their navigation paths. The viewer thus can select a desired navigation path through the pictures of the album, and this selected navigation path—such as its name—is received by the server computing device 104 (210). Parts 208 and 210 of the method 200 can be considered as the server computing device 104 determining a navigation path through the album.

In one implementation, where there are multiple navigation paths for an album, the navigation paths are displayed in a ranked order, which may or may not be specific to the viewer. As an example in which the display order is not specific to the user, during the time around a particular holiday, the navigation paths that are related to that holiday may be displayed higher in the order than other navigation paths.

In response to receiving the selected navigation path from the viewer, the pictures of the album are displayed in the sequence specified by the selected navigation path (214). For instance, the server computing device 104 can cause the viewer client computing device 106 to display the pictures in the sequence of the selected navigation path. The server computing device 104 may transmit the pictures in an order corresponding to this sequence, to the client computing device 106. The pictures may be displayed automatically in this sequence, in a slideshow-like manner, or the user may manually navigate the pictures by pressing next or previous graphical user interface elements displayed with the pictures.

The viewer him or herself may also be permitted to create an additional navigation path (or paths) through the pictures of the album, in which case the server computing device 104 receives this additional navigation path that also has a name and specifies a sequence of a number of pictures within the album (216). The server computing device 104 then adds this additional navigation path to the previously created navigation paths, such as those received from the creator in part 204 (218). In this way, album viewing becomes more interactive in nature. For a given user's album having a large number of pictures, different friends of this social networking web site user may create different navigation paths through the album for all of these friends to use.

FIG. 3 shows an example method 300 that generalizes parts 206, 208, 210, 212, and 214 of the method 200. In response to a viewer requesting to view an album of pictures created by a creator (302), the server computing device 104 determines a navigation path through the album (304), such as by performing parts 208 and 210 in one implementation. The server computing device 104 then causes the viewer client computing device 106 to display the number of pictures of the album in the sequence specified by the navigation path that has been determined.

Figure 5:
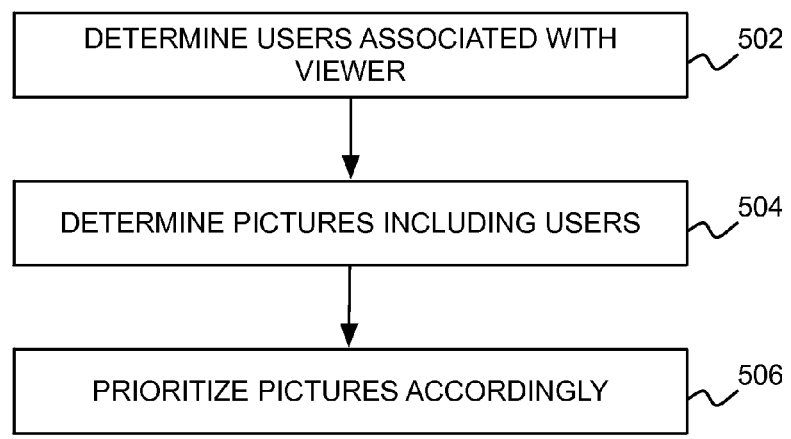
Figure 6:
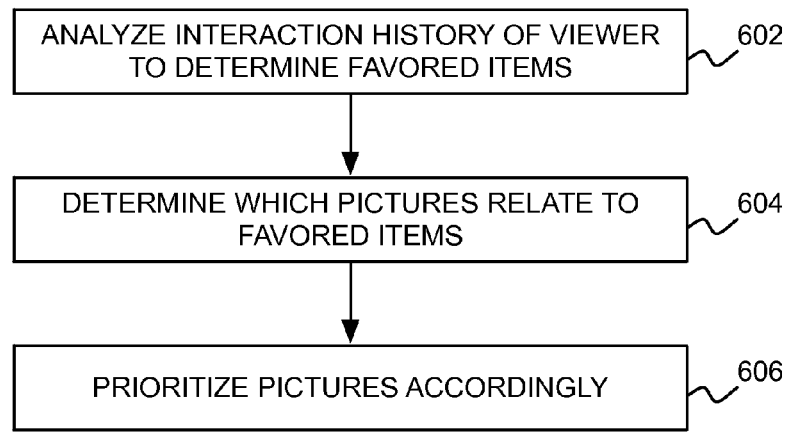

FIGS. 4, 5, and 6 show different example methods 400, 500, and 600, respectively, by which the server computing device 104 can determine the navigation path through an album of pictures in part 304 in a manner other than by performing parts 208 and 210. In the method 400 of FIG. 4, content in which the viewer is interested is determined from a profile of the viewer on the social networking web site (402). Which pictures of the album are related to this content are then determined (404), and prioritized within a sequence of a created navigation path (406). Other pictures of the album that are not related to the content may not be displayed to the viewer, or may be displayed last in the sequence of the navigation path.

For example, a social networking web site may permit a viewer to interactively indicate his or her "likes" or even "dislikes," such as activities in which the viewer enjoys participating, things that the viewer enjoys collecting, seeing, or buying, and so on. Such content is part of the viewer's profile on the web site, which the viewer's friends may be able to see. After obtaining a list of this content, the pictures of the album that are related to this content can be determined. For instance, if the creator of the album has tagged the pictures with various content, or has created captions for the pictures, such information can be matched to the viewer's content of interest. As another example, image analysis techniques can be employed to determine what content is in each photo, and thereafter this information matched to the viewer's content of interest.

At a coarse level of granularity, the pictures that relate to the viewer's content of interest are placed higher in the sequence, or are selected as the only pictures of the album that will be displayed to the viewer in accordance with the navigation path in question. The order of these pictures, however, may not be particularly determined. The order may be randomly selected, for instance or determined in chronological order.

At a finer level of granularity, the pictures that relate to the viewer's content of interest may themselves be ordered within the sequence depending on the extent to which they cover the viewer's content of interest. For example, a picture that is 90% soccer may be prioritized before a picture that is 20% soccer for a viewer interested in soccer, where the percentage in which a picture covers soccer is determined using an image analysis technique. As another example, if the viewer's interests include all sports generally and soccer in particular, a soccer-related picture covers two interests—sports and soccer—and thus may be prioritized before a baseball-related picture that covers just sports and not soccer.

In the method 500 of FIG. 5, users with whom the viewer is associated on the social networking web site are determined (502). The pictures of the album that include these users are then determined (504), and prioritized within a sequence of a created navigation path (506). Other pictures of the album that do not include these users may not be displayed to the viewer, or may be displayed last in the sequence.

For example, a social networking web site typically permits its users to have friends. A user sends a friend request to another user, and if the latter user accepts this request, the two users become friends. The users with whom the viewer is associated can thus be determined as the viewer's friends on the social networking web site.

The pictures of the album that include these users can be determined in a number of different manners. For instance, if the creator of the album has tagged the pictures with the users that are present therein, then this information can be matched to the viewer's associated users. As another example, image analysis techniques can be employed to determine which users are in each photo, and thereafter this information matched to the viewer's associated users.

Levels of granularity can also govern the ordering of the pictures that include associated users within the sequence of the created navigation path. For instance, pictures that include more associated users of the viewer may be prioritized before pictures that include less associated users. As another example, pictures that include the users' closest friends, and/or family, may be given priority within the sequence—that is, the relationship strength that the viewer has with each associated user is taken into account in prioritization of the pictures within the sequence. The users associated with the viewer can include the viewer him or herself, and may be given highest priority within the sequence.

The methods 400 and 500 rely on information that the viewer has purposefully and directly generated in using the social networking web site. The content of interest of the viewer's profile used in the method 400, for instance, is generated from a user directly indicating that he or she likes something. The associated users of the viewer used in the method 500 similarly are generated from a user directly sending or accepting friend requests.

By comparison, in the method 600 of FIG. 6, an interaction history of the viewer with the social networking web site is analyzed to determine passively generated favored items of the viewer (602), apart from the viewer's profile and apart from the users with whom the viewer is associated. As a viewer uses a social networking web site, he or she may view status updates, photos, and other information regarding content and people without directly liking the former or befriending the latter. Nevertheless, such viewing passively generates favored items of the viewer, insofar as the viewer would not be looking at such content or people if the viewer were not interested in them. Although such favored items may overlap with the content of the viewer's profile and/or with the viewer's friends, this information is typically not coextensive with either.

Analysis may include determining the frequency of items that the viewer has actively viewed on the social networking web site, such that the items having the highest frequency are selected as the favored items. How long ago the user has viewed the items may also be taken into consideration, where items viewed more frequently and more recently are selected as the favored items over items viewed less frequently and less recently. Favored item determination may thus focus on determining the items in which the viewer has most recently been most interested.

Once the viewer's interaction history has been analyzed to determine the viewer's favored items, which pictures of the album relate to these favored items are determined (604). Determining which pictures of the album relate to favored items can be determined in a similar manner by which the pictures that relate to content is determined in part 404 and/or by which the pictures that include associated users is determined in part 504. These pictures are then accordingly prioritized within the sequence of the navigation path through the album being created (606). Prioritization of the pictures can be achieved in a similar manner by which the pictures that relate to content are prioritized in part 406 and/or by which the pictures that include associated users is determined part 506.

Unlike parts 208 and 210 of the method 200, the methods 400, 500, and 600 determine a navigation path in part 304 of the method 300 without direct involvement of either the creator or the user. A viewer's profile in the method 400, a viewer's associated users in the method 500, and a viewer's interaction history on the social networking web site in the method 600 permit the server computing device 104 to generate a navigation path that is not explicitly created by the creator of the album or the viewer thereof. Because different viewers will typically have different profiles, associated users, and interaction histories, this means that different viewers can have different navigation paths created for them through the same album of pictures.

It is noted further that the methods 400, 500, and/or 600 can be used together in combination, too, as well as in conjunction with parts 208 and 210 of the method 200. As one example, navigation paths may be created by all the methods 400, 500, and 600, and presented to the viewer to select therefrom. As another example, the navigation paths created by the creator may be listed to the viewer, along with an option to generate a custom navigation path just for the viewer, such that the viewer is permitted to select the particular navigation path of interest as either one created by the creator or one that is generated in accordance with the methods 400, 500, and/or 600.

Figure 7:
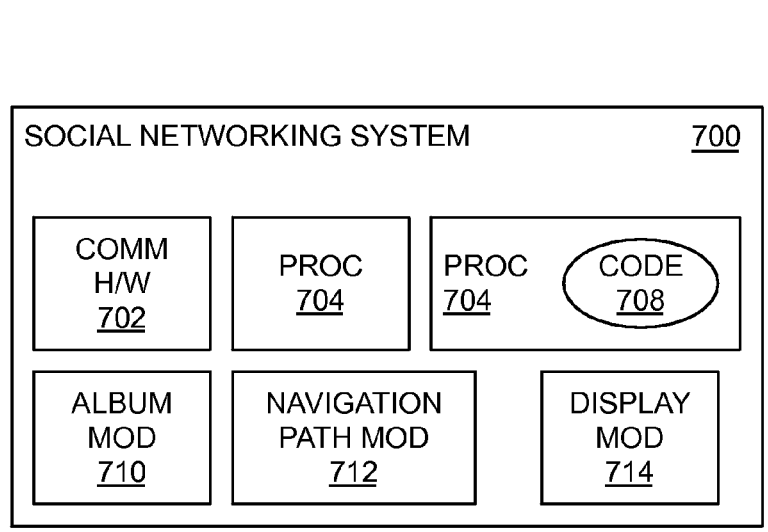
FIG. 7 is a diagram of an example system for a social networking web site that can perform the methods of FIGS. 2, 3, 4, 5, and 6.

FIG. 7 shows an example social networking system 700 for a social networking web site. The system 700 can implement the social network server computing device 104, and thus may include or be one or more such computing devices. The system 700 can perform the methods 200, 300, 400, 500, and 600 that have been described.

The system 700 includes at least communication hardware 702, a processor 704, and a storage device 706 storing computer-executable code 708. The communication network hardware 702 communicatively connects the system 700 with client computing devices of users of the social networking web site, such as the client computing devices 102 and 106, over a network, such as the network 108. The code 708 is executable by the processor 704 to implement modules 710, 712, and 714.

The module 710 is an album module that permits a creator to upload pictures to the social networking web site and to create an album of the pictures. The module 712 is a navigation path module that determines one or more navigation paths through the album, as has been described. The module 714 is a display module to display the pictures of the album to a viewer in a sequence specified by one of the navigation paths, as has also been described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A computer program product comprising a storage device storing computer-executable code executable by a server computing device for a social networking web site to perform a method comprising:

in response to a viewer operating a viewer client computing device requesting to view an album of pictures, determining a navigation path specifying a sequence in which a number of the pictures are to be viewed by the viewer, the sequence being different than an order in which a creator of the album uploaded the pictures to the social networking web site when creating the album, including prioritizing the pictures of the album that include users on the social networking web site that are associated with the viewer on the social networking web site within the sequence, by ordering the pictures that include the users based on how many of the users are included within the pictures; and after determining the navigation path, causing the viewer client computing device to display the number of the pictures in the sequence specified by the navigation path.

2. The computer program product of claim 1, wherein determining the navigation path further comprises:

sending to the viewer client computing device a name of each of a plurality of available navigation paths through the album; and receiving from the viewer selection of the name of one of the available navigation paths, where the one of the available navigation paths becomes the navigation path specifying the sequence in which the viewer client computing device is caused to display the number of the pictures.

3. The computer program product of claim 1, wherein determining the navigation path further comprises:

determining content in which the viewer is interested, from a profile of the viewer on the social networking web site;

determining which of the pictures of the album are related to the content.

4. The computer program product of claim 3, wherein any of the pictures of the album that are unrelated to the content are not part of the number of the pictures of the album that are to be viewed by the viewer, are not specified within the sequence, and are not displayed by the viewer client computing device in conjunction with the navigation path.

5. The computer program product of claim 3, wherein any of the pictures of the album that are unrelated to the content are displayed by the viewer client computing device last in the sequence specified by the navigation path, after the pictures of the album that are related to the content are displayed.

6. The computer program product of claim 1, wherein determining the navigation path further comprises:

determining the users on the social networking web site that are associated with the viewer on the social networking web site;

determining which of the pictures of the album include the users.

7. The computer program product of claim 6, wherein the users that are associated with the viewer on the social networking web site includes the viewer.

8. A system for a social networking web site comprising:

communication hardware to communicatively connect with client computing devices of users of the social networking web site, including a viewer and a creator;

a processor;

a storage device to store computer-executable code executed by the processor;

an album module implemented by the computer-executable code to permit the creator to upload pictures to the social networking web site and to create an album of the pictures;

a navigation path module implemented by the computer-executable code to determine one or more navigation paths through the album, each navigation path specifying a sequence in which a number of the pictures are to be viewed by the viewer, including prioritizing the pictures of the album that include users on the social networking web site that are associated with the viewer on the social networking web site within the sequence by ordering the pictures within the sequence based on relationship strengths the view has with the users included within the pictures; and a display module implemented by the computer-executable code to display the pictures of the album to the viewer in the sequence specified by one of the navigation paths.

9. A method comprising:

in response to a viewer operating a viewer client computing device requesting to view an album of pictures, determining a navigation path specifying a sequence in which a number of the pictures are to be viewed by the viewer, the sequence being different than an order in which a creator of the album uploaded the pictures to the social networking web site when creating the album, including:

analyzing an interaction history of the viewer on the social networking web site, apart from a profile of the viewer on the social networking web site and apart from users on the social networking web site that are associated with the viewer on the social networking web site, to determine favored items of the viewer;

prioritizing the pictures of the album that relate to the favored items within the sequence in which the number of the pictures of the album are to be viewed by the viewer; and after determining the navigation path, causing the viewer client computing device to display the number of the pictures in the sequence specified by the navigation path.

10. The method of claim 9, wherein determining the navigation path further comprises:

sending to the viewer client computing device a name of each of a plurality of available navigation paths through the album; and receiving from the viewer selection of the name of one of the available navigation paths, where the one of the available navigation paths becomes the navigation path specifying the sequence in which the viewer client computing device is caused to display the number of the pictures.

11. The method of claim 9, wherein determining the navigation path further comprises:

determining content in which the viewer is interested, from a profile of the viewer on the social networking web site;

determining which of the pictures of the album are related to the content.

12. The method of claim 11, wherein any of the pictures of the album that are unrelated to the content are not part of the number of the pictures of the album that are to be viewed by the viewer, are not specified within the sequence, and are not displayed by the viewer client computing device in conjunction with the navigation path.

13. The method of claim 11, wherein any of the pictures of the album that are unrelated to the content are displayed by the viewer client computing device last in the sequence specified by the navigation path, after the pictures of the album that are related to the content are displayed.

14. The method of claim 9, wherein determining the navigation path further comprises:

determining the users on the social networking web site that are associated with the viewer on the social networking web site;

determining which of the pictures of the album include the users.

15. The method of claim 14, wherein the users that are associated with the viewer on the social networking web site includes the viewer.

16. The method of claim 9, wherein the interaction history comprises a frequency of items that the viewer has actively viewed on the social networking web site, such that the items having a highest frequency are selected as the favored items.

17. The method of claim 9, wherein the favored items comprise favored people that are not coextensive with the users on the social networking web site that are associated with the viewer on the social networking web site.

18. The method of claim 9, wherein the favored items comprise favored content that is not coextensive with content in which the viewer has specified on a profile of the viewer on the social networking web site.

* * * * *